3,065,571
COMPOSITE MATERIAL OF PLATINUM ALLOY AND GLASS
James S. Hill, Cranford, N.J., assignor, by mesne assignments, to Engelhard Industries, Inc., Newark, N.J., a corporation of Delaware
No Drawing. Filed Oct. 10, 1957, Ser. No. 689,262
6 Claims. (Cl. 154—2.4)

The present invention is concerned with the problem of obtaining a mechanically-resistant, air-tight bond between metal and glass and, more specifically, of obtaining air-tight metallic seals through glass as e.g. electrical lead-in conductors into glass containers.

In numerous industrial fields, the necessity to obtain such bonds occurs, as e.g. in apparatus for the electro-chemical industry, electrical discharge devices, electrical contacts and so forth, and the attempts to improve the adherence of metal to glass, which usually is bonded thereto in its molten state, include the application of specific methods of cleaning the contacting surfaces, the use of certain pressures, temperatures and even of certain atmospheres surrounding the parts to be bonded at the moment of contacting the components and during the cooling off period.

The present invention is concerned with a new approach to the problem which consists in utilizing the wetting power of a liquid.

The free surfaces of liquids show the phenomenon called capillarity which is caused by the specific surface tension of the liquid on one hand and, on the other hand, by the inter-molecular affinity of the liquid to the solid wall material of the capillary. The resultant of the components may either cause the liquid to wet the solid surface, which might be a capillary or merely a surface in contact with the liquid, or, in the opposite case, repulsion can take place.

Assuming that molten glass represents a liquid and that the bond formed between any surface in contact therewith must be tighter if the inter-molecular affinity between them results in a positive wetting action, numerous tests were made with alloys and thereby it was found that an alloy of about 90 percent to 99.9 percent by weight of platinum and about 10 percent to 0.1 percent by weight of silver shows an affinity for molten glass which results in a wetting action which is superior to the metals or alloys used heretofore. By applying the customary methods of bonding molten glass to the pre-formed metallic portions of the aforementioned alloys, the inter-molecular attraction contributes greatly to the improvement of the obtained bond.

In accordance with the invention, the metallic portion, e.g. a lead-in conductor for an electrical discharge tube, is pre-shaped from an alloy of about 90 percent to 99.9 percent by weight of platinum and about 10 percent to 0.1 percent by weight of silver. Preferably an alloy of about 95 percent by weight of platinum and about 5 percent by weight of silver is used, which was found to give best results. Subsequently, the bonding of the metallic portion to the glass portion is performed according to any of the known methods, e.g. for lead-in seals by applying, simultaneously, heat to melt the glass and pressure within a mold to give the lead-in seal the desired shape.

The term glass, as used herein, includes porcelain and quartz glass as well since these materials behave in a similar manner.

It will be obvious to those skilled in the art that many modifications may be made within the scope of the present invention without departing from the spirit thereof, and the invention includes all such modifications.

What is claimed is:
1. A composite material comprising glass bonded to an alloy of about 90 percent to 99.9 percent by weight of platinum and about 10 percent to 0.1 percent by weight of silver.
2. A composite material comprising glass bonded to an alloy of about 95 percent by weight of platinum and about 5 percent by weight of silver.
3. A metallic seal through and bonded to glass wherein the metal is an alloy of about 90 percent to 99.9 percent by weight of platinum and about 10 percent to 0.1 percent by weight of silver.
4. A metallic seal through and bonded to glass wherein the metal is an alloy of about 95 percent by weight of platinum and about 5 percent by weight of silver.
5. An electrical conductor through and bonded to glass made from an alloy of about 90 percent to 99.9 percent by weight of platinum and about 10 percent to 0.1 percent by weight of silver.
6. An electrical conductor through and bonded to glass made from an alloy of about 95 percent by weight of platinum and about 5 percent by weight of silver.

References Cited in the file of this patent

UNITED STATES PATENTS

| | | |
|---|---|---|
| 227,370 | Mann | May 11, 1880 |
| 248,419 | Edison | Oct. 8, 1881 |
| 1,140,134 | Eldred | May 18, 1915 |
| 1,635,320 | Heany | July 12, 1927 |
| 2,010,605 | Miller | Aug. 6, 1935 |
| 2,129,721 | Wise | Sept. 13, 1938 |
| 2,300,286 | Gwyn | Oct. 27, 1942 |
| 2,391,457 | Carlson | Dec. 25, 1945 |
| 2,399,094 | Brown | Apr. 23, 1946 |
| 2,534,392 | Walsh | Dec. 19, 1950 |
| 2,564,738 | Tank | Aug. 21, 1951 |
| 2,664,180 | Peters | Dec. 29, 1953 |
| 2,760,310 | Nelson | Aug. 28, 1956 |

OTHER REFERENCES

Metals Handbook, 1948 edition, published by American Society of Metals, page 1154.